Figure 1:
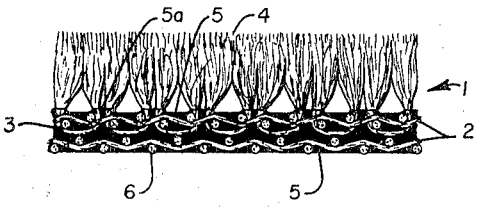
Figure 4:
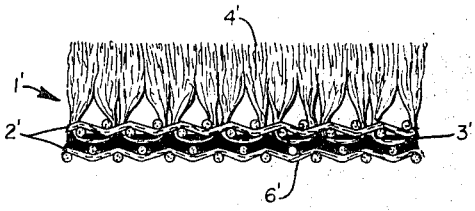
Figure 2:
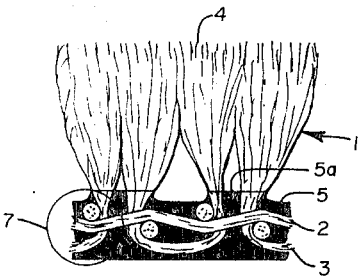
Figure 5:
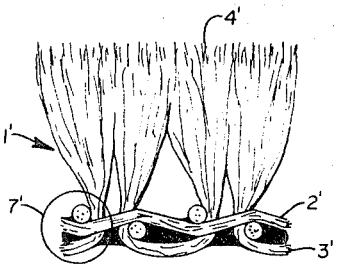
Figure 3:
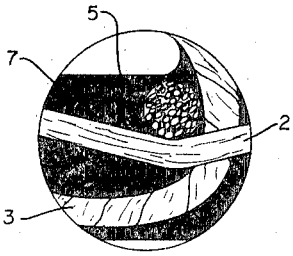
Figure 6:
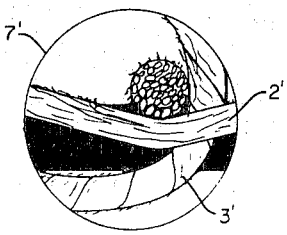

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED AUG. 1, 1972

901 O.G. 6

T901,003

CARPET CONSTRUCTION HAVING HIGH RESISTANCE TO PROPAGATION OF FLAMING ON CONTACT WITH INCANDESCENT OR BURNING BODIES

James W. Henry, 3958 Skyland Drive 37664, and Clarence C. Dannelly, Rte. 8 37462, both of Kingsport, Tenn.

Filed Mar. 10, 1971, Ser. No. 122,850
Int. Cl. D03d *27/00*
U.S. Cl. 161—66
1 Sheet Drawing. 19 Pages Specification

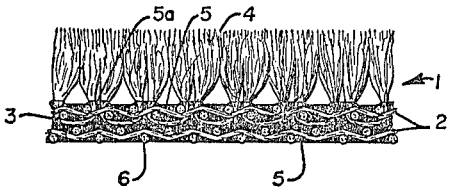

Propagation of flaming or burning of horizontally disposed carpet or rug construction composed of a jute or other backing fabric having synthetic or natural fibers tufted thereinto is substantially reduced by either (1) impregnating the jute backing with a layer of a high melting heat-absorbing thermoplastic material having a relatively high ignition temperature (compared to the ignition temperature of the tufted fibers), such as latex, cellulose ester, polyester, polypropylene, or the like, to such an extent or in such an amount that the thermoplastic material penetrates the backing fabric and forms a thin heat-absorbing surface layer or barrier on the upper surface of the backing and in intimate and heat-conducting contact with the tufts of the rug or carpet, or (2) laminating a sheet or layer of such thermoplastic material on the upper surface of the backing fabric and thereafter weaving or punching the tufts into and through the laminated structure whereby they will be in intimate heat-conducting and heat-absorbing contact with the thermoplastic layer.

Aug. 1, 1972 J. W. HENRY ET AL T901,003

CARPET CONSTRUCTION HAVING HIGH RESISTANCE TO PROPAGATION OF FLAMING ON CONTACT WITH INCANDESCENT OR BURNING BODIES

Filed March 10, 1971

JAMES W. HENRY
CLARENCE C. DANNELLY
INVENTORS

BY Malcolm F. Dunn

ATTORNEY